(12) United States Patent
Nguyen

(10) Patent No.: US 7,549,911 B2
(45) Date of Patent: Jun. 23, 2009

(54) MEDIA CONTROL VALVE WITH PRESSURE BALANCE LOOP

(75) Inventor: Phoung Taylor Nguyen, Richmond, TX (US)

(73) Assignee: Axxiom Manufacturing, Inc., Fresno, TX (US)

( * ) Notice: Subject to any disclaimer, the term of this patent is extended or adjusted under 35 U.S.C. 154(b) by 318 days.

(21) Appl. No.: 11/705,241

(22) Filed: Feb. 12, 2007

(65) Prior Publication Data

US 2008/0190499 A1 Aug. 14, 2008

(51) Int. Cl.
*B24C 7/00* (2006.01)

(52) U.S. Cl. .......................... 451/101; 451/99; 251/63; 251/121; 251/224

(58) Field of Classification Search .................. 451/38, 451/39, 40, 75, 99, 101; 251/121, 63, 63.5, 251/297, 221, 222, 223, 224; 137/217
See application file for complete search history.

(56) References Cited

U.S. PATENT DOCUMENTS

| | | | | |
|---|---|---|---|---|
| 5,401,205 A | * | 3/1995 | Shank, Jr. | 451/101 |
| 5,407,379 A | * | 4/1995 | Shank et al. | 451/99 |
| 5,412,910 A | * | 5/1995 | Woodson et al. | 451/38 |
| 6,425,804 B1 | * | 7/2002 | Pettit et al. | 451/38 |
| 7,300,336 B1 | * | 11/2007 | Nguyen et al. | 451/101 |
| 2002/0052175 A1 | * | 5/2002 | Pettit et al. | 451/60 |
| 2005/0242310 A1 | * | 11/2005 | Takiguchi et al. | 251/28 |

\* cited by examiner

*Primary Examiner*—Eileen P. Morgan
(74) *Attorney, Agent, or Firm*—Robert C. Curfiss

(57) ABSTRACT

A media control valve includes a valve body having a media inlet and a media outlet with the valve body being adapted to be mounted on a flow device for providing communication between the media outlet and the flow device. A pressure balance flow line is provided in communication with the valve body and also with the flow device at a point upstream of the media outlet for balancing the pressure in the valve. A check valve may be included in the balance flow line for assuring that flow generally flows from the flow device to the valve body. A cleanout port may be provided for permitting clean out of the valve without disassembly when not in use.

5 Claims, 5 Drawing Sheets

MEDIA CONTROL VALVE WITH PRESSURE BALANCE LOOP

BACKGROUND OF THE INVENTION

1. Field of the Invention

The present invention is related to media control and, more specifically, media control valves used to control the flow of a media into a fluid stream as part of an apparatus for treatment of a surface.

2. Description of the Related Art

A typical media control valve is the pipe side valve shown and described in U.S. Pat. No. 4,322,058, issued to Thompson, et al on Mar. 30, 1982 (the "Thompson Patent"). This valve has been has been widely accepted in applications where the flow of particulate material, such as sand or other abrasive material, from a tank or hopper, is fed into a blast line for propelling the particulate material or media through a nozzle.

As shown in the Thompson Patent, the valve has a unitary plunger which is movable axially with respect to a lateral particulate material inlet between positions closing and opening the inlet. The plunger is moved by rotation on a threaded portion of the plunger through an internally threaded or tapped cap or bonnet opening. The valve body passage through which the plunger is disposed, and the plunger itself, are formed to have abrasion resistant surfaces.

A lateral air pipe nipple sealed to the valve body receives the abrasive material flowing through the valve for use in blasting operations.

Various improvements to the basic media control valve have been proposed. For example, U.S. Pat. No. 5,407,379 ("the '379 patent") and U.S. Pat. No. 5,401,205 ("the '205 patent") disclose a media control valve having a media passage between the media control valve and the conduit. The media passage converges into a slot-shaped outlet in the conduit so as to reduce the perimeter of the outlet placed perpendicular to air flow and consequently reduce turbulence as air passes across the outlet. The media control valve disclosed in the '205 and '379 patents is particularly useful in metering and dispensing sodium bicarbonate media. The '045 patent, discussed previously, also discloses a modification of the original media control valve, including the use of multiple seals around a plunger of the valve with an exhaust therebetween to remove any contaminants that breach the seals.

Despite the various improvements in myriad valve designs for a variety of applications, the valve disclosed in the Thompson patent is to this day a widely accepted valve for blasting operations. As desirable as this valve is, there remains room for improvement, especially with respect to wear reduction, as well as repair and maintenance of the valve.

It is desirable to improve on the various prior art designs by incorporating design changes which reduce wear on the valve by the abrasive effects of the media flowing through the valve, particularly during start up. It has been found that the most significant factor in wear is the abrasive action of the media during repeated start and stop cycles. Therefore, modifications in the valve which minimize the effects of abrasion during start/stop cycles will enhance the life of the valve, reduce down time and reduce maintenance and repair costs.

SUMMARY OF THE INVENTION

The subject invention is directed to a media control valve with a valve a bypass loop for equalizing pressure during startup operation. Specifically, the valve includes a pressure fluid inlet upstream of the valve media outlet. When the valve system is off, the system is typically depressurized. In typical applications, a backflow into the valve is caused by the fact that on startup the pressure increase in the media tank is at a slower rate than the pressure increase in the blast line. Thus, there is a backflow from the blast line into the valve until both the media tank and the blast line pressures are equal. This continues until the valve is again equalized with the media flowing through the valve and into the pressurized fluid stream.

The subject invention is directed to a valve having a balancing or equalizing pressure loop for minimizing or reducing the backflow of pressurized fluid into the valve through the media outlet port during startup. In it most basic form, the balancing loop has an inlet that is upstream of the valve media outlet. When the fluid is pressurized, the fluid will flow into this inlet. The loop outlet is directly into the valve above the sleeve area. This permits the valve to "pressure up" with minimal backflow from the pressurized fluid stream through the media outlet. As the media flows into the stream, the balanced pressure reduces the turbulence in the valve and likewise, reduces the turbulent action, greatly reducing wear and tear on the plunger, sleeve and body.

In one aspect of the invention, a check valve is provided in the balancing loop for assuring that media does not backflow into the loop after equalization is achieved. This minimizes the possibility of clogging the balancing loop with media and assures that the valve works as intended during normal operation.

The invention also includes a cleanout port provided in the valve for cleaning out debris that may obstruct media flow and residue media after use. This permits cleanout of the valve without disassembly. The ability to cleanout the valve after use further reduces wear and tear on the valve and minimizes maintenance and repair. In the preferred embodiment of the invention the cleanout feature can be used by opening the cleanout port to atmosphere and activating the system pressure from the blast line to "blow out" the obstruction. Specifically, backflow is permitted in the phase to quickly clear out obstructions or debris during startup. This generally required only when the system is operated in a blowdown mode where the media tank vessel and the blast line are not pressurized when the system is off.

It is, therefore, an object and feature of the invention to provide a media control valve having a pressure balancing system for reducing or minimizing the backflow of pressurized fluid into the valve through the valve media outlet during startup.

It is a further object and feature of the invention to provide a media control valve having a pressure balancing system for introducing pressurized fluid into the valve body upstream of the valve media outlet for reducing turbulence in the valve body during startup.

It is also an object and feature of the invention to provide a media control valve adapted for reducing the abrasive action of the media in the valve during startup.

It is a further object and feature of the invention to provide a media control valve wherein the backflow of pressurized fluid and media into the balancing system is minimized after equalization is achieved.

It is yet another object and feature of the invention to provide a media control valve with the capability of cleaning or purging the valve of media after each use without disassembling the valve.

Other objects and features of the invention will be readily apparent from the accompanying drawings and description.

DETAILED DESCRIPTION OF THE PREFERRED EMBODIMENTS

The present invention is directed to a valve for controlling the flow of a media to a fluid stream, referred to herein as a media control valve. By media, it is meant any material or materials that may be desired to be added to another material or materials. While various solid, fine particulate, blasting media, such as sand, metal shot, and the like, are used by way of example herein, the media that may be supplied by the media control valve of the present invention is not so limited, and may include a wide variety of materials including liquids and gasses as well as solid particles. The subject invention is particularly useful when used in applications containing solid particles of a defined maximum particulate size. The bypass feature described herein is particularly beneficial in normally depressurized systems where the media tank and the blast line are at atmospheric pressure when the system is OFF, i.e., when the system is used in a "blowdown" mode.

The invention is directed to a media control valve which includes a valve body having a media inlet and a media outlet within the valve body and being adapted to be mounted on a flow device for providing communication between the media outlet and the flow device. A pressure balance flow line is provided in communication with the valve body and also with the flow device at a point upstraam of the media outlet for balancing the pressure in the valve. A check valve may be included in the balance flow line for assuring that flow generally flows from the flow device to the valve body. A cleanout port may be provided for permitting clean out of the valve without disassembly when not in use.

In one embodiment, the media control valve of the present invention includes a valve body having a media inlet and a media outlet. A housing is connected to the valve body. A plunger is positioned within the valve body. A sleeve is mounted in the body and receives the plunger. Typically, the valve, plunger and sleeve assembly are mounted on a base. The media flows through the valve and sleeve, as metered by the plunger, and into the base.

The base is connected to a pressure fluid source, such as compressed or pressurized air, for mixing with the media as it flows through the media control valve and out of the valve outlet port and for driving the media/pressure fluid mix through the base and into the nozzle outlet.

It is an important feature of the valve that a pressure balancing loop is provided for balancing pressure during startup of the operation for reducing the tendency of the pressurized fluid from flowing back into the valve through the media outlet port. This backflow is caused by higher blast line pressure than media tank pressure. Combined with having an abrasive media in the media tank, this causes a turbulent wear condition in the valve.

Figure 1:
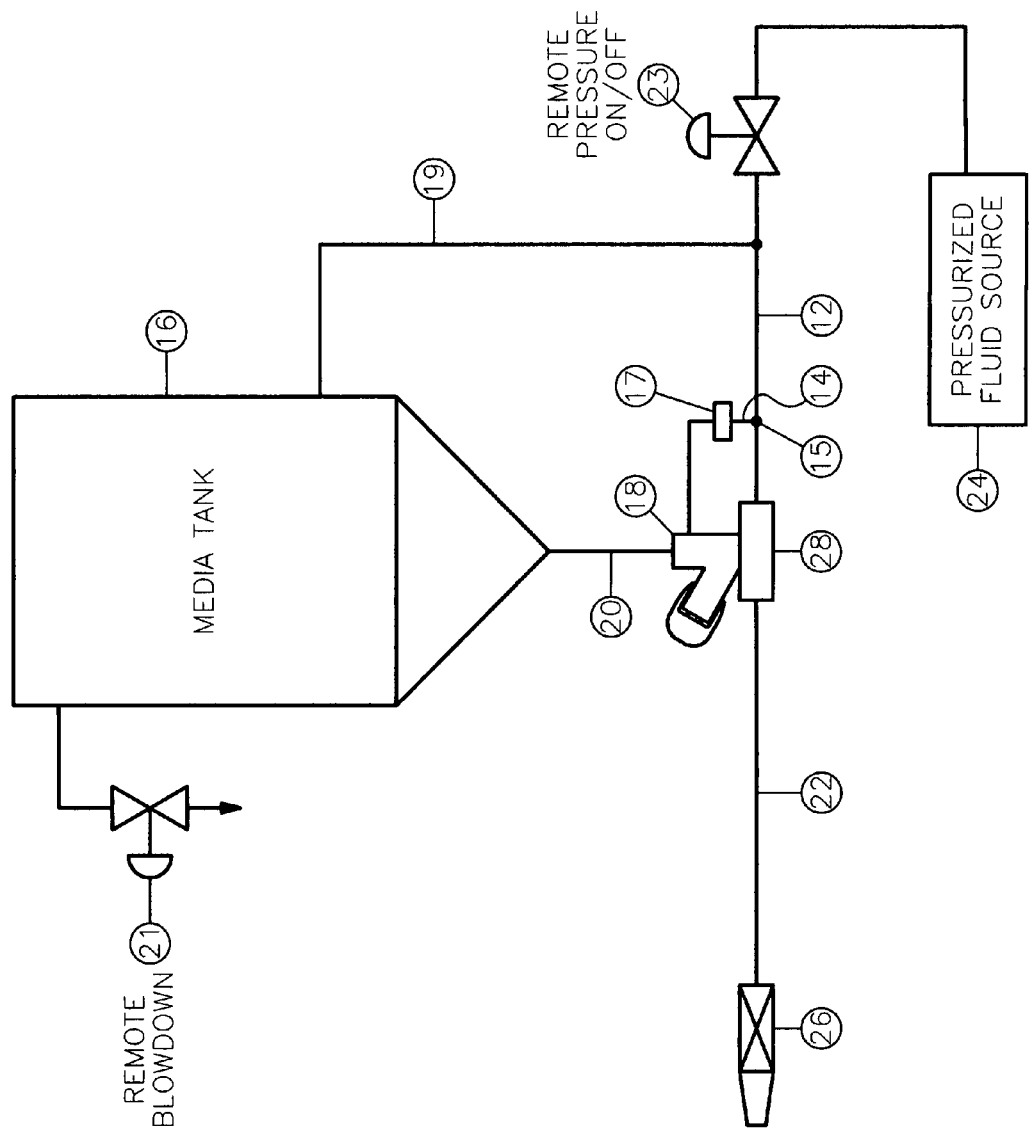
FIG. 1 is a circuit diagram of the pressure system and balancing loop for a media control valve in accordance with the subject invention.

With specific reference to FIG. 1, it will be noted that the fluid pressure circuit 10 has a primary pressure flow path 12 and a balancing loop path 14. The media tank 16 is in communication with the media control valve 18 via the media flow line 20. The main flow line 22 is downstream of both the media control valve 18 and the pressurized fluid source 24. The combined flow lines 12 and 22 are commonly referred to as a blast line. The media tank is pressurized via tank pressure line 19. Typically, a blowdown valve 21 is present to permit equalization to atmospheric pressure when the system is off. A Remote pressure on/off valve 23 is provided to start and stop pressurized fluid flow into the blast line 12, 22 and the media tank pressure line 19. In normal operation, the remote blowdown valve 21 and the remote pressure valve 23 are controlled simultaneously and remotely with each valve in opposite mode of the other. When the blowdown valve is closed or shut off to atmosphere, the pressurization valve is open. This connects the media tank 16 and the blast line 12, 22 to the fluid source 24. When the blowdown valve 21 is open to atmosphere, the pressure valve 23 is closed or shut off from the fluid source 24. This allows the media tank and blast line to eventually depressurize to atmospheric pressure. This is the OFF mode in a blowdown operation. Most systems are normally OFF or fail safe. When in the ON mode with the remote blowdown valve 21 closed and the pressure valve 23 open, the system pressures up. When operating pressure is achieved, metered media flows by gravity feed through the valve 18 and into the main flow line 22 via media outlet port 28, where it is mixed with the pressurized fluid flowing in line 12. The media/fluid mix is then propelled through main line 22 and through nozzle 26. An on/off valve is typically located at the nozzle 26 for control by the operator. It is during the startup mode when the system is first pressuring up when backflow is experienced permitting flow from the blast line 12, 22 into the valve 18.

In the subject invention, the balancing loop 14 is in communication with the fluid pressure line 12, as indicated at 15. The line 14 is also in communication with the media chamber in the media control valve 18. The balance loop is upstream of the media outlet 28. Whenever the valve is under balanced, i.e., when the pressure in the valve is lower than the pressure in the fluid line at valve 15, pressurized fluid flows through the balance loop 14 to equalize the pressure. This typically happens during start/up and during on/off cycling. By balancing the pressure in this manner the amount of backflow from line 12 into the valve 18 is minimized.

In the preferred embodiment a check valve 17 is provided in the balance loop to assure that there is not any backflow from the media control valve into the balance loop. This assures that the amount of media entering the loop is minimized and prevents potential clogging of the balance loop once the pressure in valve 18 is equalized.

Figure 2:
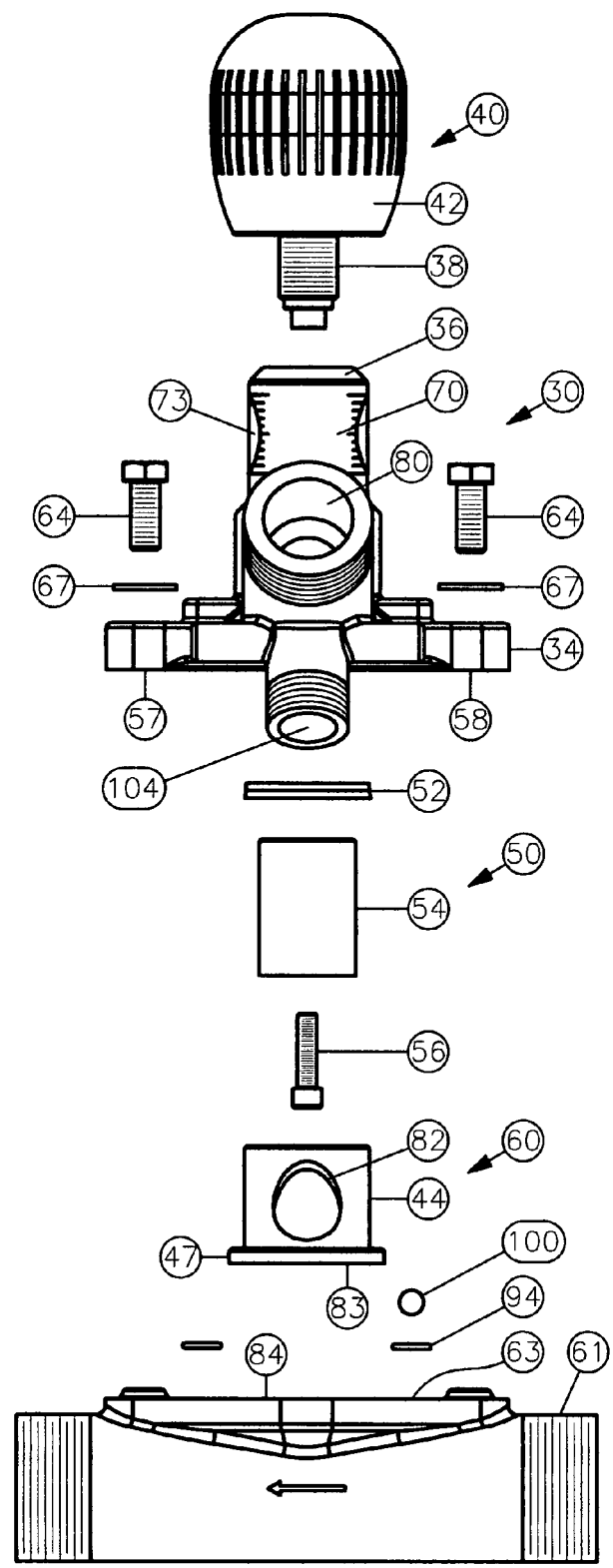
FIG. 2 is an exploded view of a media control valve in accordance with the subject invention.

FIG. 2 is an exploded view of a control valve in accordance with the subject invention. As there shown, the entire valve assembly is housed in a base or body 30 having a central bore 32 (see FIG. 3), and a mounting flange 34. The upper open end 36 of the bore is tapped to receive the threaded shaft 38 of the knob assembly 40. The modular design of the valve permits three separate modules which can be manufactured, assembled and repaired separately. However, the balancing loop may be utilized with any valve configuration, as will be fully appreciated by the following discussion.

The fully assembled valve is mounted on a typical base mounting flange 63 in the well known manner, with the base 61 having an inlet port 84 in communication with the media outlet port 83 in the valve.

Figure 3:
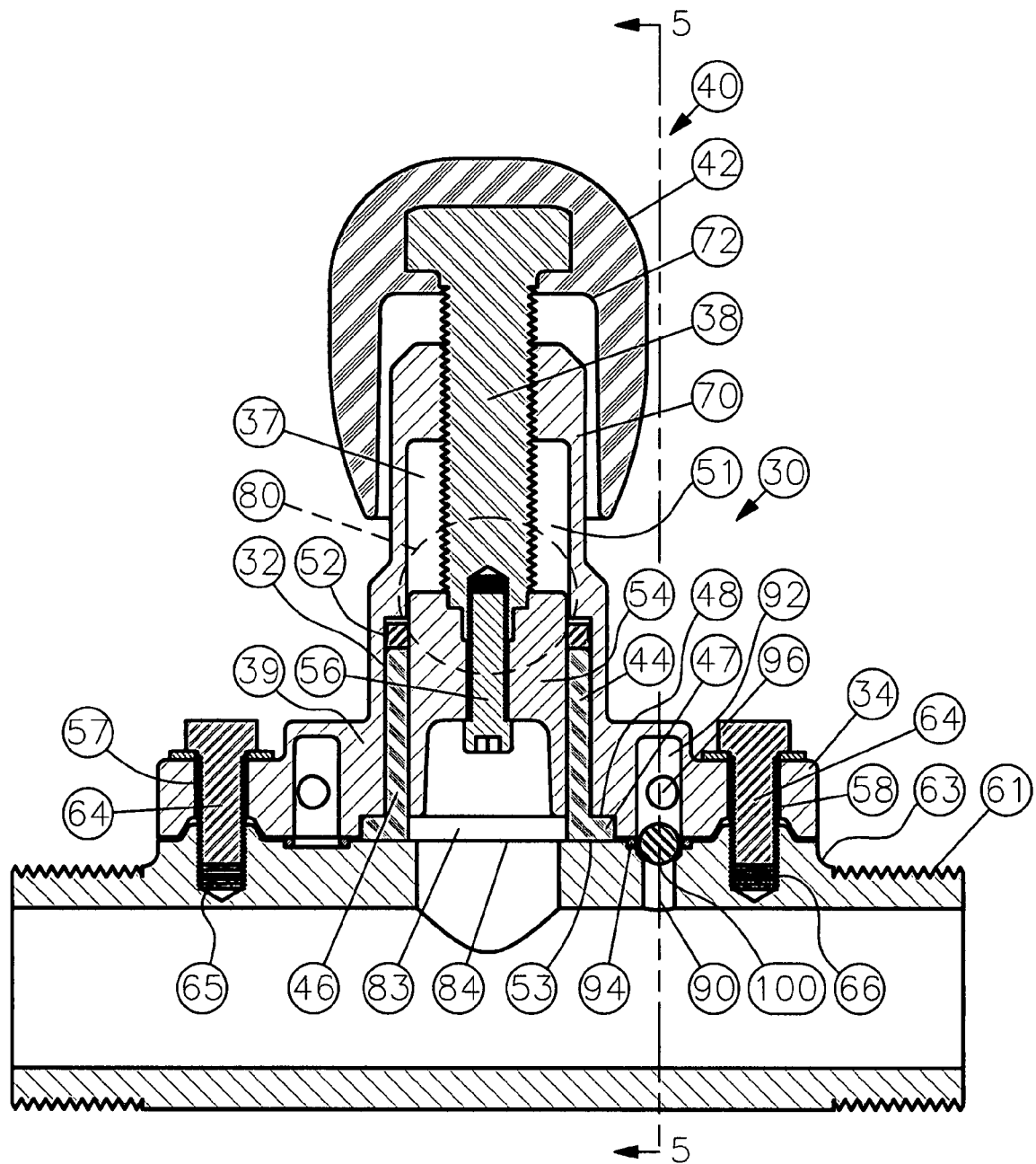
FIG. 3 is a longitudinal cross-section of the assembled modular media control valve of FIG. 2, taken along a section line corresponding to the axis of the base to which the valve is mounted.
Figure 4:
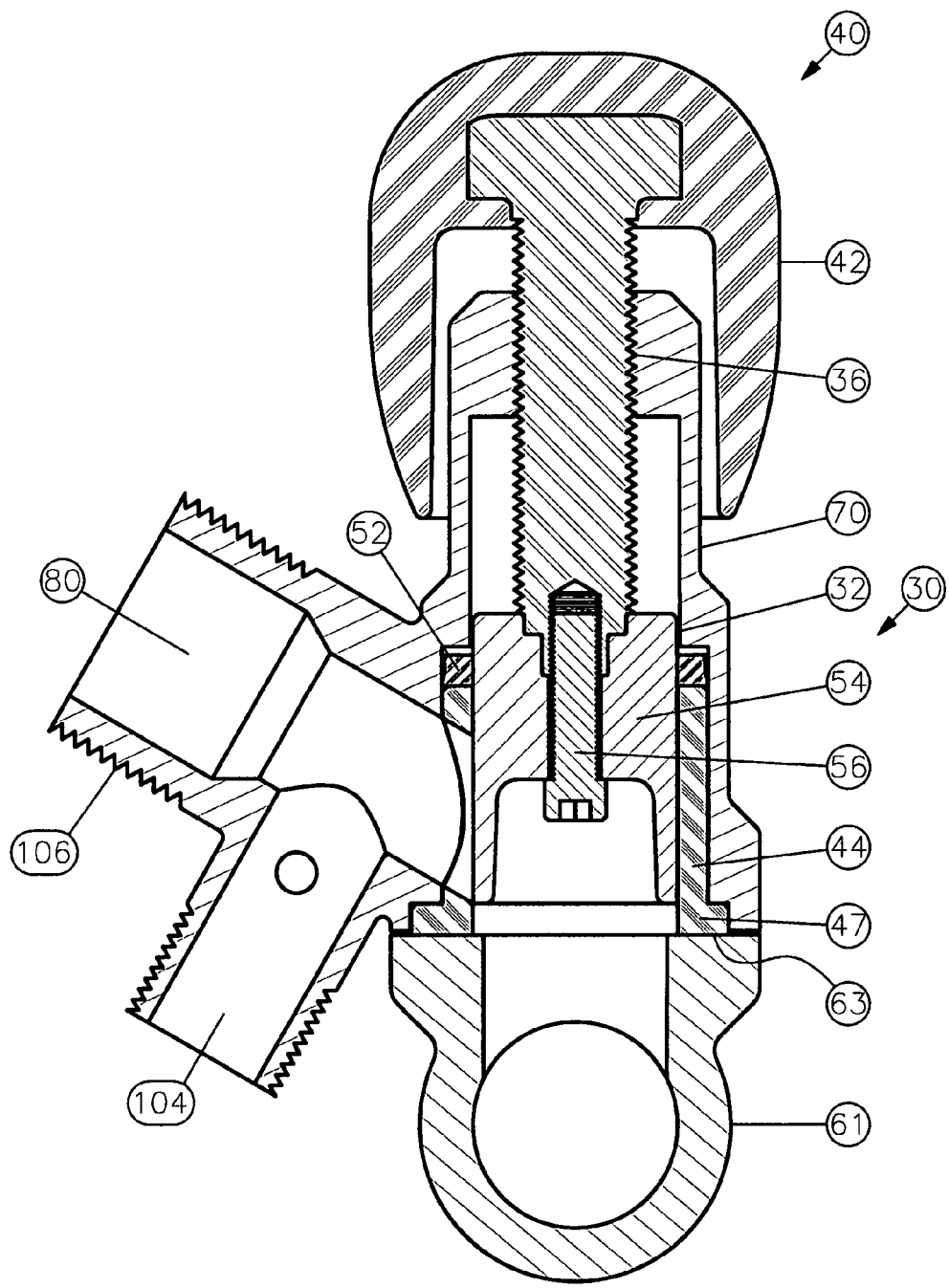
FIG. 4 is a horizontal cross-section of the assembled modular media control valve of FIG. 2, taken along a section line intercepting the axis of the base.

As best shown in FIGS. 3 and 4, the valve body 30 includes an upper, tapped bore 36 for receiving threaded shaft 38 of the control knob assembly 40. A metering knob 42 is secured to the shaft 38 and the threaded shaft is carried in the valve body.

The plunger assembly 50 includes the plunger seal 52, the plunger 54 and the plunger mounting bolt 56.

The sleeve assembly 60 comprises the sleeve 44 and integral seal 47.

With specific reference to the drawings, it will be noted that the lower end 39 of the body receives the sleeve 44 in an enlarged bore 46. The sleeve 44 fits in the enlarged bore and has an inner diameter which is approximately the same as the inner diameter of the mid-bore zone 51 of the body. The lower end of the body is recessed or stepped at 48 to receive the shoulder 47 of the sleeve. When assembled, the plunger 54 is designed to move axially relative to the sleeve to provide a metered opening for media flow.

The body is typically made of a hard metal material, whereas the sleeve is typically a softer synthetic material, as is well known to those who are skilled in the art. The shoulder 47 on the sleeve is slightly thicker than the depth of the recess 48 such that it extends beyond the lower face 53 of the valve body when assembled. This defines a seal between the body 30 and the base flange 63 when the valve body and base are assembled.

The plunger seal 52 is received in the body bore between the sleeve and the upper tapped portion 37 of the body bore. The plunger seal is made of a resilient synthetic material. The plunger 54 is placed in the valve body bore and is secured to the knob assembly 40 by the plunger bolt 56, as best seen in FIGS. 3 and 4.

The outer flange 34 of the body includes two mounting holes 57, 58. These mate with tapped bore holes 65, 66, respectively, on the mounting flange 63 provided on the base 61, as best seen in FIGS. 3 and 4. Mounting bolts 64 and spacer washers 67 are used to secure the body to the base. As the body is tightened down, the shoulder 47 on the sleeve 44 is compressed between the lower face 53 of the body and the outer wall of the base flange 63, providing a tight, integral seal between the body and the base.

The upper post portion 70 of the body is adapted to receive the inner hollow bore 72 of the knob 42, as best seen in FIGS. 3 and 4. Metering marks 73 are provided on the outer wall of the post portion 70 for permitting accurate adjustment of the knob and plunger as it is turned into and out of the body. In the preferred embodiment of the invention, the metering marks are an accurate visual representation of the position of the plunger relative to the sleeve orifice, giving an accurate visual representation of the metered opening in the valve.

Once assembled, the valve works in typical fashion. The media inlet 80 (FIG. 2) permits the flow of media into the valve and through the media port 82 in the sleeve at the rate controlled by the position of the plunger 54. This is controlled by turning the control knob to the appropriate metering position 73 on the valve post 70. The media flows out of the valve through media outlet port 83 and into the base through base media opening or media inlet port 84 in the mounting flange 63 of base 61. There it is mixed with a pressurized fluid such as pressurized air or the like, and propelled from the base into and through a nozzle, not shown.

Figure 5:
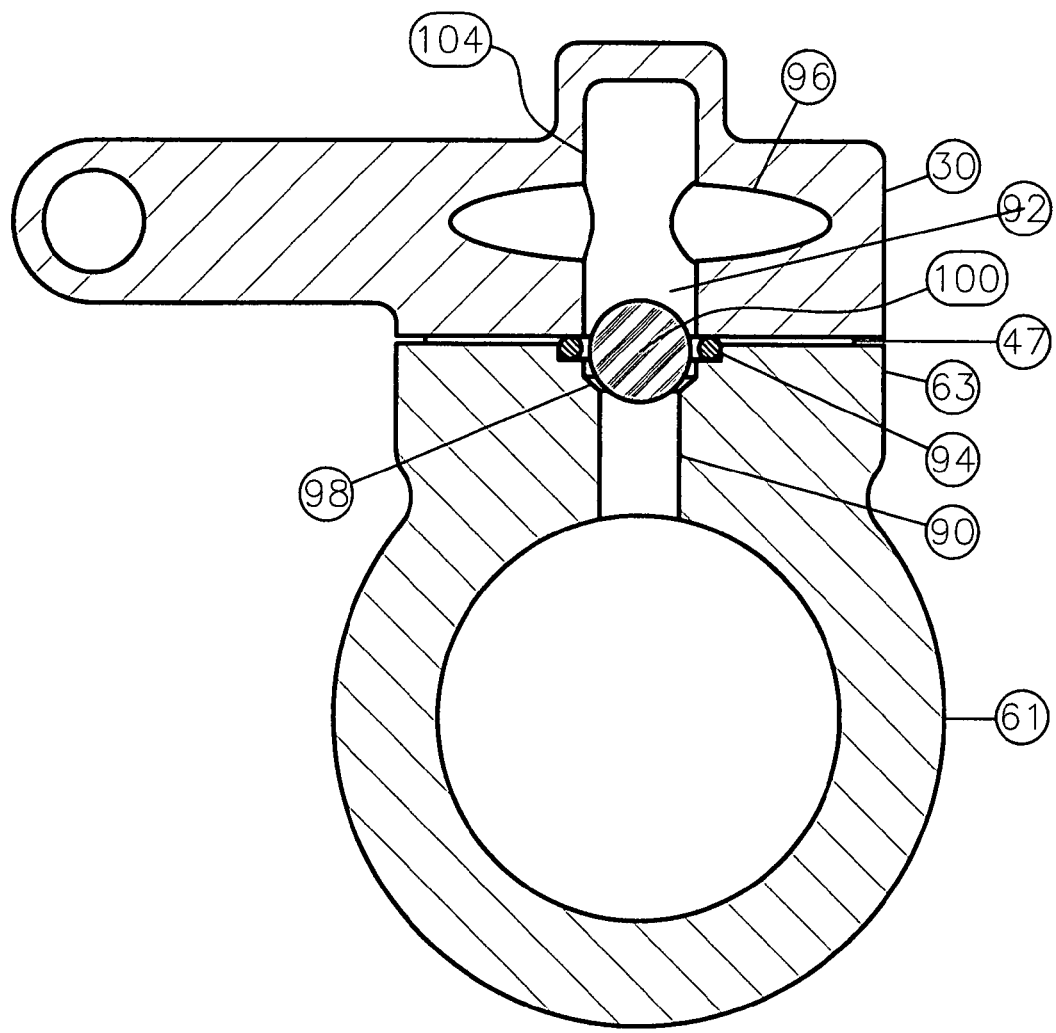
FIG. 5 is an enlarged section view taken along line 5-5 of FIG. 4.

The balance loop as incorporated in a media control valve is best shown FIGS. 3, 4 and 5. With specific reference to FIG. 3, it will be noted that there is a bore 90 in the base flange 63. The bore 90 is in communication with a mated bore 92 in the mounting flange 34 of the valve assembly 30. A seal 94 is provided between the mounting surfaces of the two flanges. The bore 90 is in communication with the interior chamber of the base 61. The bore 92 is in communication with the fluid conduit path 96 (FIGS. 4 and 5) in the valve for providing communication into the valve body in the media flow chamber.

In the preferred embodiment a ball seat 98 is provided in the end of bore 90 for receiving the ball check valve 100. The ball check valve moves upwardly, as shown, into bore 92 when fluid is flowing from the base into the balance line. When the pressure is equalized, the ball 100 will be seated in the ball seat, sealing the line against backflow from the media control valve.

Another feature of the media control valve of the subject invention is a cleanout port 104 as best shown in FIGS. 2 and 4. The cleanout port is in direct communication with the media chamber of the valve and permits cleanout of the valve when not in use. Typically, the outer end of the cleanout port post is externally threaded as shown at 106, to permit a threaded cap to be placed thereon for closing the port when the valve is in use.

In the preferred embodiment of the invention the balance loop 14 is in communication with the media chamber of the valve via the intersecting bore 96. This provides a compact design which is easy to manufacture and assemble. However, it should be understood that the balance loop and the clean out port may be utilized independently of one another. While in the preferred embodiment of the valve the balance loop is shown as an integral feature of the valve construction, it should be readily understood that the balance loop may be external of the valve and base body without interfering with the intended function.

While certain features and embodiments of the valve assembly of the present invention have been described and shown in detail herein, it should be understood that the invention incorporates all modifications and enhancements within the scope and spirit of the following claims.

What is claimed is:

1. A media control valve, comprising: a valve body having a media inlet and a media outlet, the valve body being adapted to be mounted on a flow device for providing communication between the media outlet and the flow device; and a pressure balance flow line in communication with the valve body and also with the flow device at a point upstream of the media outlet for balancing the pressure in the valve, wherein the balance flow line includes a check valve for assuring that flow generally flows from the flow device to the valve body, and wherein the valve body includes a mounting flange for mounting the valve body on a mated mounting flange provided on the flow device, and wherein the media outlet of the valve is located in the mounting flange, the balance flow line also being located in the mounting flange and mating with a port in the flow device upstream of the media outlet.

2. The valve of claim 1, wherein there is further provided a ball seat in the port provided in the flow device, the ball seat being in communication with the balance flow line in the valve body, and a ball mounted in the seat such that it can move into the balance flow line when the port in the flow device is pressurized.

3. The valve of claim 1, including a resilient seal between the mounting flanges for sealing the junction between the balance flow line and its mated port.

4. The valve of claim 1, further including a closeable cleanout port for cleaning the port the valve when not in use.

5. The valve of claim 4, wherein the balance flow line introduces flow into the valve body adjacent the clean out port.

* * * * *